(12) United States Patent
Jin et al.

(10) Patent No.: US 9,001,537 B2
(45) Date of Patent: Apr. 7, 2015

(54) POWER FACTOR CORRECTION CIRCUIT

(75) Inventors: Hong-Yuan Jin, Taoyuan Hsien (TW);
Yan Chen, Taoyuan Hsien (TW);
Hong-Jian Gan, Taoyuan Hsien (TW);
Jian-Ping Ying, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 340 days.

(21) Appl. No.: 13/523,615

(22) Filed: Jun. 14, 2012

(65) Prior Publication Data
US 2013/0257390 A1    Oct. 3, 2013

(30) Foreign Application Priority Data
Mar. 29, 2012 (CN) .......................... 2012 1 0092653

(51) Int. Cl.
*H02H 7/125* (2006.01)
*H02M 1/42* (2007.01)
*H02M 1/00* (2006.01)
*H02M 7/219* (2006.01)

(52) U.S. Cl.
CPC .... *H02M 1/4233* (2013.01); *H02M 2001/0048* (2013.01); *H02M 2007/2195* (2013.01); *Y02B 70/126* (2013.01); *Y02B 70/1408* (2013.01); *Y02B 70/1491* (2013.01)

(58) Field of Classification Search
CPC .................................................... H02M 7/217
USPC ........................... 363/52, 53, 84, 89, 125, 127
See application file for complete search history.

(56) References Cited

U.S. PATENT DOCUMENTS

| | | | |
|---|---|---|---|
| 8,432,138 B2* | 4/2013 | Chen et al. ..................... | 323/207 |
| 2003/0107354 A1 | 6/2003 | Lin et al. | |
| 2007/0047277 A1 | 3/2007 | Konishi et al. | |
| 2007/0052401 A1 | 3/2007 | Lu | |
| 2010/0149846 A1* | 6/2010 | Tan et al. ..................... | 363/132 |
| 2010/0309699 A1 | 12/2010 | Nishikawa | |
| 2011/0170324 A1 | 7/2011 | Hsieh et al. | |
| 2011/0260700 A1 | 10/2011 | Chen et al. | |
| 2013/0070504 A1* | 3/2013 | Xu et al. ..................... | 363/132 |

FOREIGN PATENT DOCUMENTS

| | | |
|---|---|---|
| JP | 2004072846 A | 3/2004 |
| TW | 534341 U | 5/2003 |
| TW | I234698 | 6/2005 |
| TW | I269954 | 1/2007 |
| TW | I288866 | 10/2007 |
| TW | M368113 U1 | 11/2009 |

* cited by examiner

*Primary Examiner* — Matthew Nguyen
(74) *Attorney, Agent, or Firm* — CKC & Partners Co., Ltd.

(57) ABSTRACT

A power factor correction (PFC) circuit includes an AC power, a first bridge arm and a second bridge arm. The first bridge arm includes first and second switches connected in series with each other. A second terminal of the first switch is connected to a first terminal of the second switch, and coupled to a first end of the AC power via a first inductor. The second bridge arm includes third and fourth switches connected in series with each other. A second terminal of the third switch is connected to a first terminal of the fourth switch and a second end of the AC power. The third and fourth switches operate in ON/OFF states by use of a control signal having an operation frequency consistent with that of the AC power. The on-state resistance of the third and fourth switches is lower than that of the first or second switch.

15 Claims, 9 Drawing Sheets

POWER FACTOR CORRECTION CIRCUIT

RELATED APPLICATIONS

This application claims priority to China Patent Application Serial Number 201210092653.8, filed Mar. 29, 2012, which is herein incorporated by reference.

BACKGROUND

1. Field of Invention

The present invention relates to the field of circuit design technology of a power adapter. More particularly, the present invention relates to a power factor correction (PFC) circuit in which a power adapter can improve operation efficiency under low voltage input and full-load output conditions.

2. Description of Related Art

A power adapter is used as power supply equipment for an electronic product in many fields, such as in the defense industry, the area of science and research, industry control, communications, electrical power, LED lighting and the instrumentation. With the continuous improvement of power adapters, increased attention is being given to the operation efficiency of power adapters under low voltage input and full-load output conditions. However, with the increasing usage of high-frequency power adapters, the switching loss of a power component of such a power adapter increases along with the increase in frequency. Consequently, significant research and development is being conducted with respect to ensuring that operation frequency is not reduced due to switching loss.

In the prior art, a common solution is that in which a bridgeless PFC topology circuit is used to improve the efficiency of the adapter. However, such a topology circuit frequently causes large common mode noise. Furthermore, a totem-pole bridgeless PFC topology circuit may also be used, in which an output capacitor is clamped to the input voltage so as to reduce the common mode noise. However, in such a topology circuit, two serially connected slow-recovery diodes are used, so that in the operation process of the adapter the current always flows through one of the two slow-recovery diodes. Furthermore, under low voltage input and full-load output conditions, the current is large, so is the entire PFC topology circuit the on-state loss of the slow-recovery diode, which limits further efficiency improvement of the adapter.

In view of this, many in the industry are endeavoring to find ways in which to design a novel PFC circuit to appropriately reduce the on-state loss of the circuit while improving the efficiency of the adapter.

SUMMARY

In order to solve the above disadvantages of the power factor correction (PFC) circuit of the prior art, a novel PFC circuit is disclosed.

An aspect of the present invention provides a PFC circuit. The PFC circuit includes an AC power, a first bridge arm and a second bridge arm. The AC power has a first end and a second end. The first bridge arm includes a first switch and a second switch connected in series with each other and each having a first terminal and a second terminal. The second terminal of the first switch is connected with the first terminal of the second switch and is coupled to the first end of the AC power via a first inductor. The second bridge arm is connected in parallel with the first bridge arm, and the second bridge arm includes a third switch and a fourth switches connected in series with each other and each having a first terminal and a second terminal. The second terminal of the third switch is connected with the first terminal of the fourth switch and the second end of the AC power. The third switch and the fourth switch both operate in ON/OFF states by use of a control signal having an operation frequency consistent with that of the AC power. The on-state resistance of the third switch and the fourth switch is lower than the on-state resistance of the first switch or the second switch.

The PFC circuit further includes a third bridge arm. The third bridge arm is connected in parallel with the first bridge arm and the second bridge arm. The third bridge arm includes a fifth switch and a sixth switch connected in series with each other and each having a first terminal and a second terminal. The second terminal of the fifth switch is connected with the first terminal of the sixth switch and is coupled to the first end of the AC power via a second inductor. The first switch of the first bridge arm and the fifth switch of the third bridge arm operate in an alternating manner.

The on-state resistance of the third switch and the fourth switch is half of the on-state resistance of the first switch or the second switch.

The PFC circuit further includes a first surge diode and a second surge diode connected in series with each other and each having a cathode and a anode. The cathode of the first surge diode is connected to the first terminal of the third switch. The anode of the second surge diode is connected to the second terminal of the fourth switch. The anode of the first surge diode is connected with the cathode of the second surge diode and the second end of the AC power. Each of the first surge diode and the second surge diode is a slow-recovery diode.

In an embodiment, when the current flowing through the third switch is less than a predetermined threshold, the first surge diode is in a turned-off state. In another embodiment, when the current flowing through the third switch is larger than a predetermined threshold, the first surge diode is in a turned-on state. The currents respectively flowing through the third switch and the first surge diode are distributed according to a corresponding on-state resistance.

The PFC circuit further includes a third surge diode and a fourth surge diode connected in series with each other and each having a cathode and an anode. The cathode of the third surge diode is connected to the first terminal of the first switch. The anode of the fourth surge diode is connected to the second terminal of the second switch. The anode of the third surge diode is connected with the cathode of the fourth surge diode and the first end of the AC power.

The PFC circuit further includes a first surge diode and a second surge diode connected in series with each other and each having a cathode and an anode, and a third surge diode and a fourth surge diode connected in series with each other and each having a cathode and a diode. The anode of the first surge diode is connected with the cathode of the second surge diode and the second end of the AC power. The anode of the third surge diode is connected with the cathode of the fourth surge diode and the first end of the AC power.

The PFC circuit further includes a clamp capacitor. One terminal of the clamp capacitor is connected to the first terminal of the third switch of the second bridge arm, and the other terminal of the clamp capacitor is connected to the second terminal of the fourth switch of the second bridge arm. When the voltage between the first end and the second end of the AC power is positive, the surge current sequentially flows through the third surge diode, the clamp capacitor and the second surge diode, so as to form a release circuit. When the voltage between the first end and the second end of the AC power is negative, the surge current sequentially flows through the first surge diode, the clamp capacitor and the fourth surge diode, so as to form a release circuit.

In an embodiment, each of the first switch and the second switch is a wide band gap (WBG) semiconductor component. The WBG semiconductor component for example is silicon carbide or gallium nitride.

By adopting the aforementioned PFC circuit, two switches connected in series with each other are arranged on the second bridge arm, so that the frequency of the control signal of the two switches is consistent with that of the AC power, and the on-state resistance of the two switches is lower than that of the switches of the first bridge arm, thereby reducing the on-state loss of the switch and improving the operation frequency of the circuit. Moreover, two surge diodes connected in series with each other are further arranged in the PFC circuit, so as to realize surge protection of the switch in the circuit during the occurrence of an electrical surge, such as that caused by a lightning strike or when the circuit is activated.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

In order to make the technical contents of the present invention more detailed and comprehensive, various embodiments of the present invention are described below with reference to the accompanying drawings. Wherever possible, the same reference numbers are used in the drawings and the description to refer to the same or like parts. However, those of ordinary skill in the art should understand that the embodiments described below are not used for limiting the scope of the present invention. Moreover, the accompanying drawings are only illustrative and are not made according to actual size.

Specific implementations in various aspects of the present invention are further described in detail below with reference to the accompanying drawings.

Figure 1:
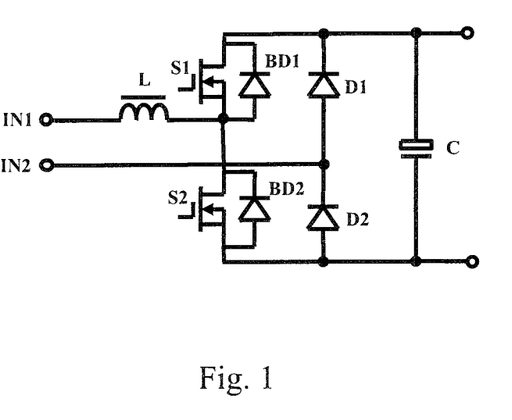
FIG. 1 illustrates a schematic circuit diagram of a bridgeless PFC circuit of the prior art.

FIG. 1 illustrates a schematic circuit diagram of a bridgeless PFC circuit of the prior art. Referring to FIG. 1, in the bridgeless PFC topology circuit, S1 and S2 are conditional switches, such as MOSFETs (metal oxide semiconductor field effect transistors). BD1 and BD2 are body diodes respectively for the switches S1 and S2. D1 and D2 are both slow-recovery diodes.

IN1 and IN2 are two ends of AC power. When the voltage between the IN1 and IN2 is positive (i.e., the positive half cycle of the voltage waveform of the AC power), a boost circuit is formed by an inductor L, the switch S2 and the body diode BD1. Similarly, when the voltage between the IN1 and the IN2 is negative (i.e., the negative half cycle of the voltage waveform of the AC power), a boost circuit is formed by the inductor L, the switch S1 and the body diode BD2. Meanwhile, in the positive half cycle of the voltage waveform of the AC power, the slow-recovery diode D2 is turned on, so as to provide a path for the current and clamp a terminal of a capacitor C to the midline. Correspondingly, in the negative half cycle of the voltage waveform of the AC power, the slow-recovery diode D1 is turned on, so as to provide a path for the current and clamp the other terminal of the capacitor C to the midline.

It can be seen from the above that regardless of whether the voltage waveform of the AC power is in a positive or a negative half cycle, one of the slow-recovery diodes D1 and D2 is always in a turned-on state. For example, in the negative half cycle of the voltage waveform, the diode D1 is always in a turned-on state, and in the positive half cycle of the voltage waveform, the diode D2 is always in a turned-on state. Thus, the on-state loss is very large. Furthermore, in the bridgeless PFC circuit and under low voltage input and full-load output conditions, the current flowing through the diode D1 or D2 is large, which causes that the on-state loss of the slow-recovery diodes D1 and D2 is increased, thereby limiting improvement in circuit efficiency.

Figure 2:
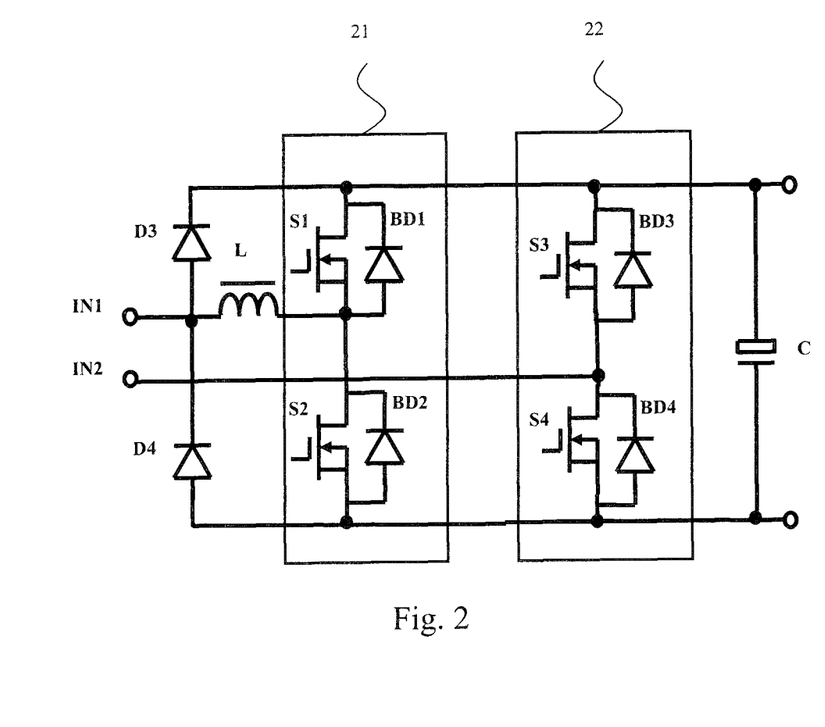
FIG. 2 illustrates a schematic circuit diagram of a PFC circuit according to a specific embodiment of the present invention.

FIG. 2 illustrates a schematic circuit diagram of a PFC circuit according to a specific embodiment of the present invention. Referring to FIG. 2, the PFC circuit includes an AC power, a first bridge arm 21 and a second bridge arm 22. The AC power has a first end IN1 and a second end IN2. In the positive half cycle of the voltage waveform of the AC power, the voltage between IN1 and IN2 is positive, and in the negative half cycle of the voltage waveform of the AC power, the voltage between IN1 and IN2 is negative.

The first bridge arm 21 includes switches S1 and S2 connected in series with each other. Each of the switches S1 and S2 includes a first terminal (a drain electrode or a source electrode), a second terminal (a drain electrode or a source electrode), a control terminal and a body diode BD1 or BD2. The second terminal of the switch S1 is connected with the first terminal of the switch S2, and is coupled to the first end IN1 of the AC power via an inductor L. Preferably, the switches S1 and S2 are of the same type. In some embodiments, each of the switches S1 and S2 is a wide band gap (WBG) semiconductor component. The WBG semiconductor component for example is silicon carbide (SiC) or gallium nitride (GaN). Also, the WBG semiconductor component for example includes other applicable WBG semiconductor components other than SiC or GaN.

The second bridge arm 22 is connected in parallel with the first bridge arm 21. The second bridge arm 22 includes switches S3 and S4 (e.g., MOSFETs) connected in series with each other. Each of the switches includes a first terminal (a drain electrode or a source electrode), a second terminal (a drain electrode or a source electrode), a control terminal and a body diode. The second terminal of the switch S3 is connected with the first terminal of the switch S4 and the second end IN2 of the AC power. It should be pointed out that in the PFC circuit of the embodiment, the switches S3 and S4 are controlled to operate in ON/OFF states by use of a control signal having an operation frequency consistent with that of the AC power (e.g., the drive signal loaded on each control terminal of the switches S3 and S4), and the on-state resistance of the switches S3 and S4 is lower than that of the switch S1 or S2. Preferably, the on-state resistance of the switches S3 and S4 is half that of the switch S1 or S2.

In a specific embodiment, the PFC circuit further includes surge diodes D3 and D4 connected in series with each other. The cathode of the surge diode D3 is connected to the first terminal of the switch S1, the anode of the surge diode D4 is connected to the second terminal of the switch S2, and the anode of the surge diode D3 connected to the cathode of the surge diode D4 and the first end IN1 of the AC power. During an electrical surge, such as that caused by a lightning strike or when the circuit is activated, surge protection of the switches can be realized in the circuit via the surge diode D3 or D4.

Comparing between FIGS. 1 and 2, the switches S3 and S4 of the embodiment operate at the operation frequency of the voltage of the AC power, in which the frequency is about 50-60 Hz. Those of ordinary skill in the art will understand that the on-state resistance of a switch is inversely proportional to its switching characteristics (including the parasitic capacitance and the drive charge thereof). Thus the higher the on-state resistance of a switch, the lower its parasitic capacitance and drive charge. On the other hand, the lower the on-state resistance of a switch, the higher its parasitic capacitance and drive charge. Since the operation frequency of the switches S3 and S4 is very low, the switching loss and the drive loss, which are directly proportional to the operation frequency, are very small and can be ignored. Thus in order to improve the circuit frequency under low voltage input and full-load output conditions, the on-state loss of the switches S3 and S4 should be as low as possible. Correspondingly, each of the switches S3 and S4 should have a low on-state resistance.

It should be pointed out that the on-state resistance of a switch is complementary with the reverse recovery characteristic of the switch. That is, the on-state resistance of a switch is inversely proportional to the reverse recovery characteristic of the switch. In particular, the higher the on-state resistance of a switch, the lower its parasitic capacitance and drive charge, which represent the reverse recovery characteristic of the switch as well. Moreover, the lower the on-state resistance of a switch, the higher its parasitic capacitance and drive charge, which represent the reverse recovery characteristic of the switch as well. In some applications, since the switching frequency of a switch is often very high, the switching loss and the drive loss, which are directly proportional to the switching frequency, are very large, and so is the on-state loss. Thus the frequency should be adjusted in consideration of both the on-state loss and the switching loss. Taking the switches S3 and S4 of the second bridge arm 22 as examples, since the switching frequency of the switches S3 and S4 is very low, the switching loss and the drive loss, which are directly proportional to the switching frequency, are also very low. In the case of the switches S3 and S4, the on-state loss is much larger than the switching loss. Thus in the PFC circuit of the embodiment, the selected switches S3 and S4 should have an on-state resistance that is as low as possible, so as to reduce the corresponding on-state loss, thereby improving the circuit efficiency under low voltage input and full-load output conditions.

Figure 3:
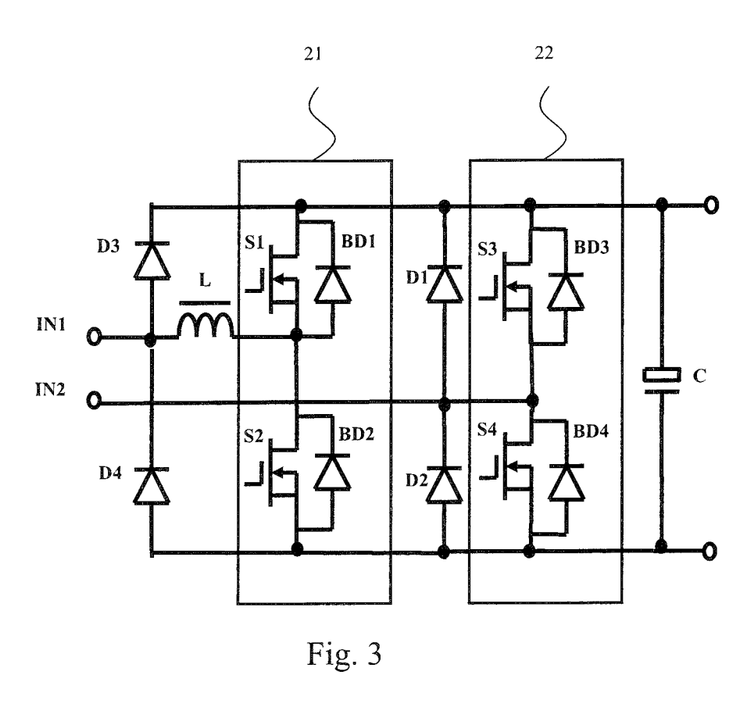
FIG. 3 illustrates a schematic circuit diagram of a preferred embodiment of the PFC circuit of FIG. 2.

FIG. 3 illustrates a schematic circuit diagram of a preferred embodiment of the PFC circuit of FIG. 2. Referring to FIG. 3, in this embodiment the PFC circuit further includes surge diodes D1 and D2 connected in series with each other. The cathode of the surge diode D1 is connected to the first terminal of the switch S3, the anode of the surge diode D2 is connected to the second terminal of the switch S4, the anode of the surge diode D1 is connected to the cathode of the surge diode D2, and the anode of the surge diode D1 (or the cathode of the surge diode D2) is also connected to the second end IN2 of the AC power. Preferably, each of the surge diodes D1 and D2 is a slow-recovery diode.

In a specific embodiment, when the current flowing through the switch S3 is less than a predetermined threshold, the surge diode D1 is in a turned-off state. Alternatively, when the current flowing through the switch S3 is larger than the predetermined threshold, the surge diode D1 is in a turned-on state, and the current flowing through the switch S3 and the surge diode D1 is distributed according to a corresponding on-state resistance.

In a specific embodiment, the PFC circuit further includes the above mentioned surge diodes D1, D2, D3 and D4. The diodes D1 and D2 are connected in series with each other, and the anode of the diode D1 is connected to the cathode of the diode D2 and the second end IN2 of the AC power. Moreover, the diodes D3 and D4 are connected in series with each other, and the anode of the diode D3 is connected to the cathode of the diode D4 and the first end IN1 of the AC power. During an electrical surge, such as that caused by a lighting strike or when the circuit is activated, surge protection of the switches can be realized in the circuit via a combination of the surge diodes D3 and D2 or D4 and D1. Preferably, the PFC circuit further includes a clamp capacitor C. One terminal of the clamp capacitor C is connected to the first terminal of the switch S3 of the second bridge arm 22, and the other terminal of the clamp capacitor C is connected to the second terminal of the switch S4 of the second bridge arm 22, so as to clamp one terminal of the second bridge arm 22 to the midline.

Those of ordinary skill in the art will understand that in some other embodiments, if the body diodes BD3 and BD4 of the switches S3 and S4 can accept the surge current, then in the PFC circuit of the embodiment the switches of the circuit are also surge protected via the combination of the surge diode D3 and the body diode BD4, or the surge diode D4 and the body diode BD3.

Figure 4:
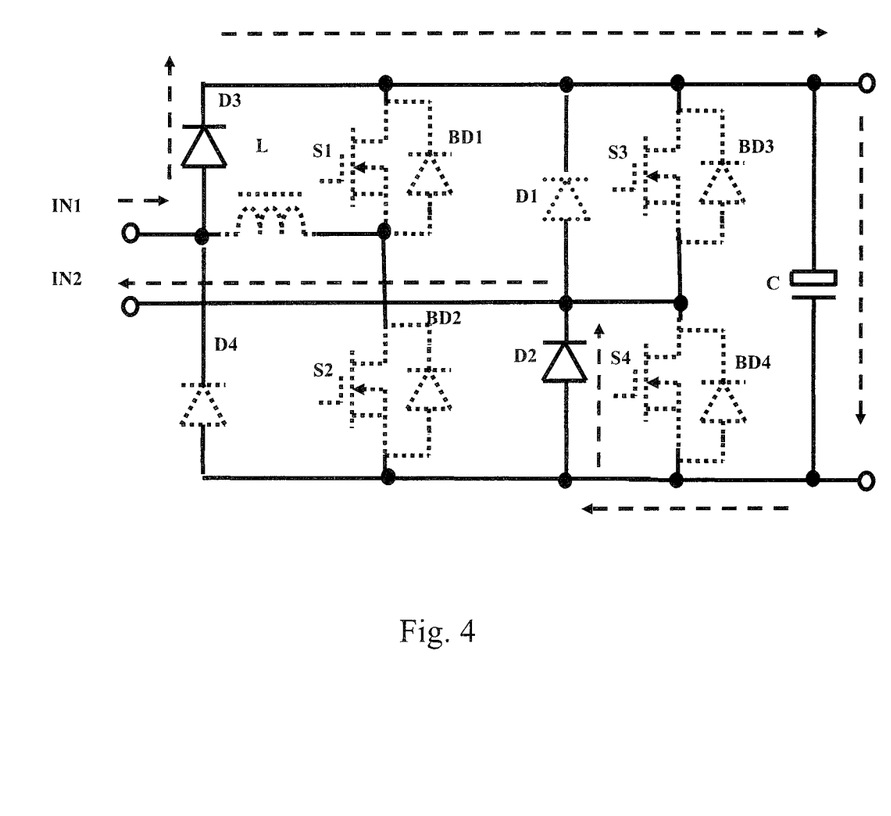
FIG. 4 illustrates a schematic view of a release path of a surge current when a voltage of AC power is positive in the PFC circuit of FIG. 3.
Figure 5:
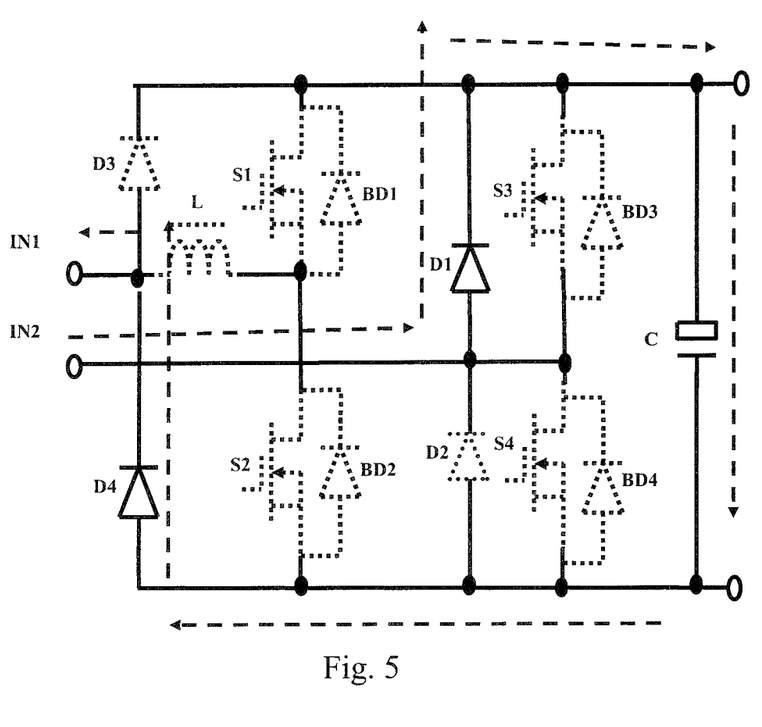
FIG. 5 illustrates a schematic view of a release path of a surge current when the voltage of the AC power is negative in the PFC circuit of FIG. 3.

If the body diodes BD3 and BD4 of the switches S3 and S4 can not accept the surge current, D1 and D2 help to form a release path of surge current and protect BD3 and BD4, as shown in FIG. 4 and FIG. 5.

FIG. 4 illustrates a schematic view of a release path of a surge current when a voltage of the AC power is positive in the PFC circuit of FIG. 3.

Referring to FIG. 4, when the voltage between the first end IN1 and the second end IN2 of the AC power is positive, a surge current caused by a lighting strike or when the circuit is activated sequentially flows through the surge diode D3, the clamp capacitor C and the surge diode D2, so as to form a release circuit. It should be pointed out that when the generated surge current is large, although the slow-recovery switch S4 is connected in parallel to the surge diode D2, the positive on-state voltage (on-state loss) of the slow-recovery switch S4 is larger than that of the surge diode D2, so that the part of the current flowing through the surge diode D2 gradually increases along with the increasing of the total current and thus the surge current flows back to the second end IN2 of the AC power by flowing through the surge diode D2.

FIG. 5 illustrates a schematic view of a release path of a surge current when the voltage of the AC power is negative in the PFC circuit of FIG. 3.

Referring to FIG. 5, when the voltage between the first end IN1 and the second end IN2 of the AC power is negative, a surge current caused by a lighting strike or when the circuit is activated sequentially flows through the surge diode D1, the clamp capacitor C and the surge diode D4, so as to form a release circuit. It should be pointed out that when the generated surge current is large, although the slow-recovery switch S3 is connected in parallel to the surge diode D1, the positive on-state voltage (on-state loss) of the slow-recovery switch S3 is larger than that of the surge diode D1, so that the part of the current flowing through the surge diode D1 gradually increases along with the increasing of the total current and thus the surge current flows back to the first end IN1 of the AC power by flowing through the surge diode D1, the clamp capacitor C and the surge diode D4.

Figure 6:
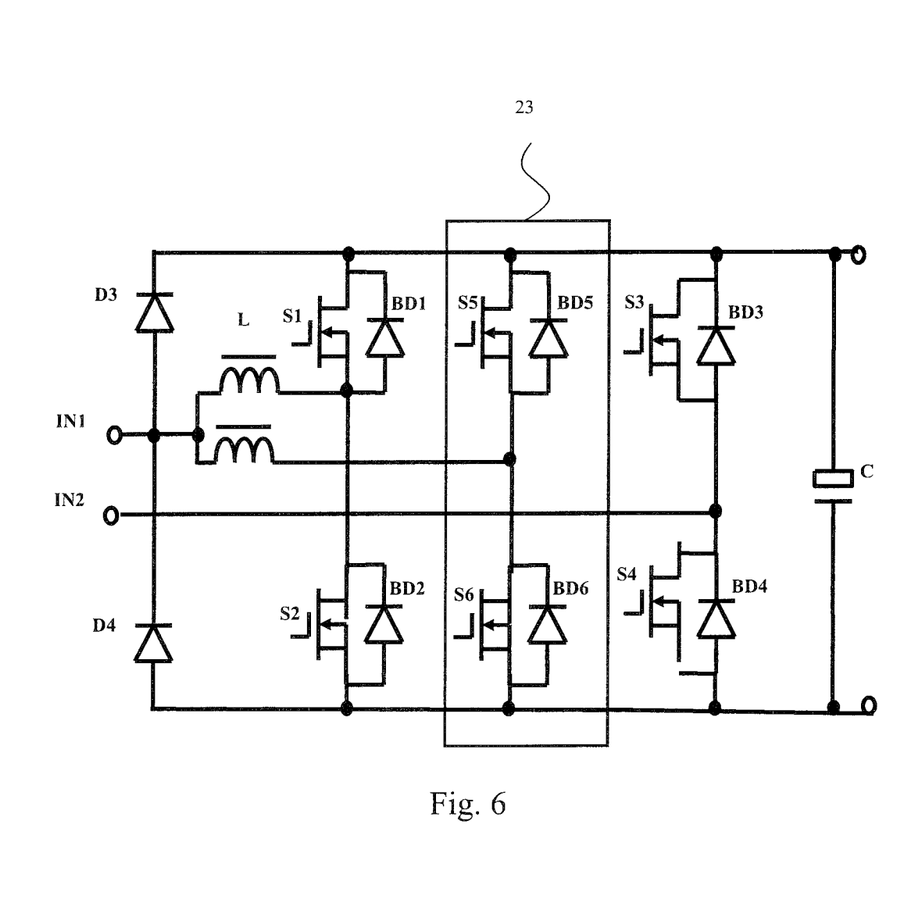
FIG. 6 illustrates a schematic circuit diagram of a PFC circuit according to another specific embodiment of the present invention.

FIG. 6 illustrates a schematic circuit diagram of a PFC circuit according to another specific embodiment of the present invention. Referring to FIG. 6, the PFC circuit further includes a third bridge arm 23. The third bridge arm 23 is connected in parallel with the first bridge arm 21 and the second bridge arm 22. The third bridge arm 23 includes switches S5 and S6 connected in series with each other. Each of the switches S5 and S6 includes a first terminal (a drain electrode or a source electrode), a second terminal (a drain electrode or a source electrode), a control terminal and a body diode (BD5 or BD6). The second terminal of the switch S5 is connected with the first terminal of the switch S6, and is coupled to the first end IN1 of the AC power via a second inductor. The switch S1 of the first bridge arm 21 and the switch S5 of the third bridge arm 23 operate in an alternating manner. Alternatively, the switch S2 of the first bridge arm 21 and the switch S6 of the third bridge arm 23 operate in an alternating manner.

Figure 7:
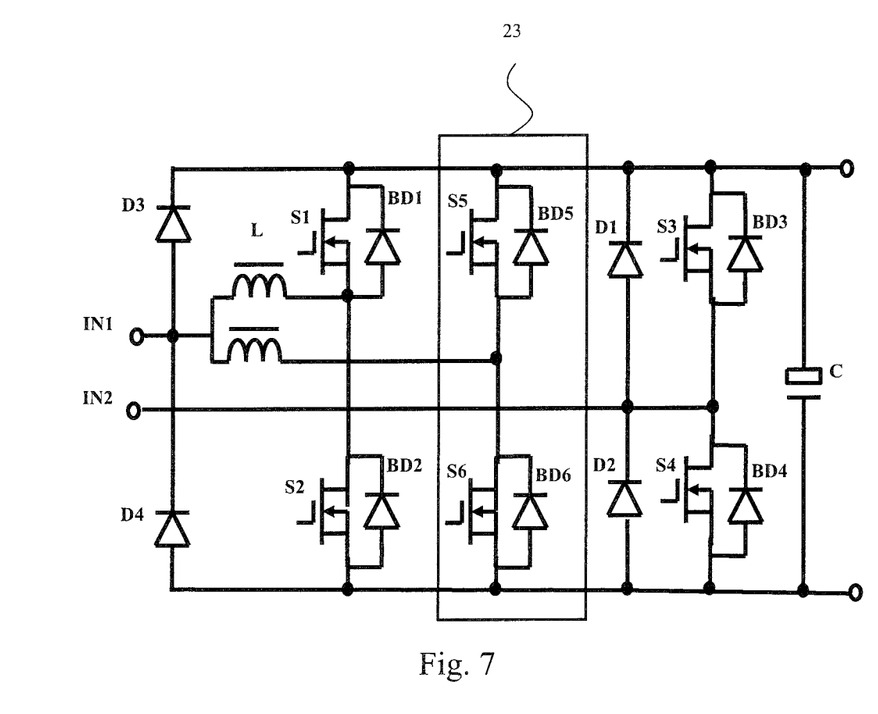
FIG. 7 illustrates a schematic circuit diagram of a preferred embodiment of the PFC circuit of FIG. 6.

FIG. 7 illustrates a schematic structure diagram of a preferred embodiment of the PFC circuit of FIG. 6. Referring to FIG. 7, in this alternative PFC circuit, surge diodes D1 and D2 or D3 and D4 connected in series with each other may also be included. The anode of the surge diode D1 is connected to the cathode of the surge diode D2 and the second end IN2 of the AC power, and the anode of the surge diode D3 is connected to the cathode of the surge diode D4 and the first end IN1 of the AC power. The operating principles of the surge diodes D1, D2, D3 and D4 have been described in detail with reference to FIG. 3, and thus a description thereof will not be repeated.

Figure 8:
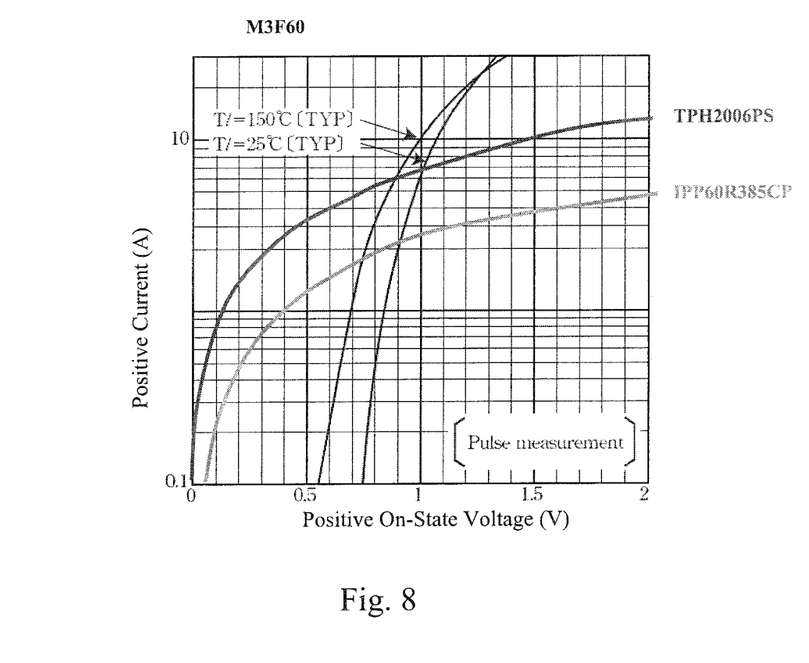
FIG. 8 illustrates a positive on-state voltage-positive current curve comparison diagram of a slow-recovery switch and a slow-recovery diode in the PFC circuit of FIG. 2 or 6.
Figure 9:
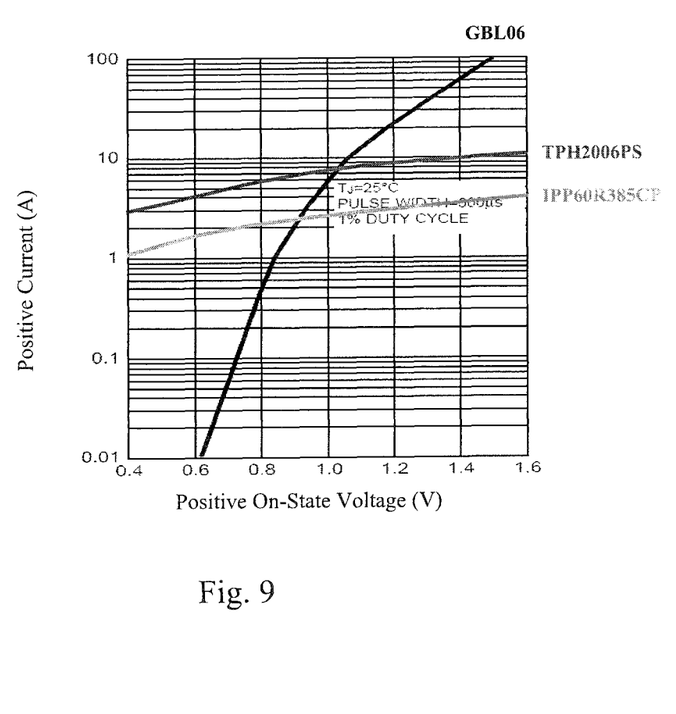
FIG. 9 illustrates a positive on-state voltage-positive current curve comparison diagram of a slow-recovery switch and another slow-recovery diode in the PFC circuit of FIG. 2 or 6.

In order to further illustrate that, compared with the slow-recovery diode of the prior art, the slow-recovery switches S3 and S4 can further improve the efficiency of the PFC circuit of the embodiment under low voltage input and full-load output conditions, FIGS. 8 and 9 respectively illustrate a positive on-state voltage-positive current curve comparison diagram of the slow-recovery switch and two slow-recovery diodes in the PFC circuit of FIG. 2 or 6.

In FIG. 8, M3F60 is a slow-recovery diode, and each of IPP60R385CP and TPH2006PS is a slow-recovery switch. It can be seen from the curve in the figure that when the positive current is less than 1.5 A, the positive on-state voltage (on-state loss) of the switch IPP60R385CP is lower than that of the slow-recovery diode M3F60. Similarly, when the current is less than 7 A, the positive on-state voltage (on-state loss) of the switch TPH2006PS is lower than that of the slow-recovery diode M3F60. It is evident that when the positive current is small, in the PFC circuit of the embodiment, the on-state loss of the slow-recovery switch is lower than that of the slow-recovery diode, so as to improve the efficiency under low voltage input and full-load output conditions.

The manner in which surge protection against surge current is realized is further considered with reference to FIGS. 4, 5 and 8. It can be seen from FIG. 2 that if the switch IPP60R385CP (i.e., the switch S3 of FIGS. 4 and 5) is connected in parallel to the slow-recovery diode M3F60 (i.e., the diode D1 of FIGS. 4 and 5), when the current is less than about 1.8 A, since the positive voltage of the switch IPP60R385CP is lower than 0.75 V, the slow-recovery diode M3F60 is still in a turned-off state. Thus the current totally flows through the switch IPP60R385CP. When the current is larger than 1.8 A, the slow-recovery diode M3F60 is turned on and thus the current flows both through the switch IPP60R385CP and the diode M3F60. The current flowing through each of the switch and the diode is distributed according to the positive on-state characteristic of each branch when the on-state voltage drop of the parallel-connected switch and the diode is the same. It can be seen that when a surge current is generated, the part of the current flowing through the slow-recovery diode M3F60 gradually increases along with the increase in the total current, so as to realize surge protection of the switch S3. Similarly, if the switch TPH2006PS is connected in parallel to the slow-recovery diode M3F60, when the current is less than 5 A, the current totally flows through the switch TPH2006PS. Moreover, when the current is larger than 5 A, the current flows both through the switch TPH2006PS and the slow-recovery diode M3F60, and the part of the current flowing through the slow-recovery diode M3F60 gradually increases along with the increase in the total current.

In FIG. 9, GBL06 is a slow-recovery diode, and each of IPP60R385CP and TPH2006PS is a slow-recovery switch. It can be seen from the curve of the figure that when the positive current is less than 2.5 A, the positive on-state voltage (on-state loss) of the switch IPP60R385CP is lower than that of the slow-recovery diode GBL06. Similarly, when the current is less than 8 A, the positive on-state voltage (on-state loss) of the switch TPH2006PS is lower than that of the slow-recovery diode GBL06. It can be seen that when the positive current is small, the on-state loss of the slow-recovery switch is lower than that of the slow-recovery diode in the PFC circuit of certain embodiments, so as to improve the efficiency under low voltage input and full-load output conditions.

The realization of surge protection against surge current is further considered in with reference to FIGS. 4, 5 and 9. It can be seen from FIG. 9 that if the switch IPP60R385CP (i.e., the switch S3 of FIGS. 4 and 5) is connected in parallel to the slow-recovery diode GBL06 (i.e., the diode D1 of FIGS. 4 and 5), when the current is less than about 1.6 A, the current totally flows through the switch IPP60R385CP. When the current is larger than 1.6 A, the slow-recovery diode GBL06 is turned on and thus the current flows both through the switch IPP60R385CP and the diode GBL06. The current flowing through each of the switch and the diode is distributed according to the positive on-state characteristic of each branch when the on-state voltage drop of the parallel-connected switch and the diode is the same. It can be seen that when a surge current is generated, the part of the current flowing through the slow-recovery diode GBL06 gradually increases along with the increase of the total current, so as to realize surge protection of the switch S3. Similarly, if the switch TPH2006PS is connected in parallel to the slow-recovery diode GBL06, when the current is less than 4 A, the current totally flows through the switch TPH2006PS. Moreover, when the current is larger than 4 A, the current flows both through the switch TPH2006PS and the slow-recovery diode GBL06, and the part of the current flowing through the slow-recovery diode GBL06 gradually increases along with the increasing of the total current.

It should also be pointed out that under the same temperature condition (such as 25° C.), the on-state resistances of the switches IPP60R385CP and TPH2006PS are 385 mΩ and 150 mΩ respectively. In view of this, the lower the on-state resistance, the wider is the current range where the on-state loss of the slow-recovery switch is lower than that of the slow-recovery diode. For example, in FIGS. 8 and 9, the current range of the switch TPH2006PS which meets the on-state loss requirement is 0-7 A, and the current range of the switch IPP60R385CP which meets the on-state loss requirement is only 0-1.5 A. Furthermore, it can also be seen from FIGS. 8 and 9 that with a relatively large positive current, the on-state voltage of the slow-recovery diode is lower than that of the slow-recovery switch, which indicates that the current impulse withstanding capability of the slow-recovery diode is greater than that of the slow-recovery switch. For example, with a limited temperature rise, the maximum impulse current that the switch IPP60R385CP can accept is 27 A, and the maximum impulse current that the switch TPH2006PS can accept is 50 A. On the other hand, the maximum impulse current that the slow-recovery diode M3F60 can accept is up to 90 A, and the maximum impulse current that the slow-recovery diode GBL06 can accept is further up to 150 A.

By adopting the PFC circuit disclosed herein, two switches connected in series with each other are arranged on the second bridge arm, so that the frequency of the control signal of the two switches is consistent with that of the AC power, and the on-state resistance of the two switches is lower than that of the switches of the first bridge arm, thereby reducing the on-state loss of the switch and improving the operation frequency of the circuit. Moreover, two surge diodes connected in series with each other are further arranged in the PFC circuit, so as to realize surge protection of the switch in the circuit during the occurrence of an electrical surge, such as that caused by a lighting strike or when the circuit is activated.

Although the present invention has been disclosed with reference to the above embodiments, these embodiments are not intended to limit the present invention. It will be apparent to those of skills in the art that various modifications and variations can be made without departing from the spirit and scope of the present invention. Therefore, the scope of the present invention shall be defined by the appended claims.

What is claimed is:

1. A power factor correction (PFC) circuit, comprising:
   an AC power having a first end and a second end;
   a first bridge arm comprising a first switch and a second switch connected in series with each other and each having a first terminal and a second terminal, wherein the second terminal of the first switch is connected to the first terminal of the second switch, and is coupled to the first end of the AC power via a first inductor; and
   a second bridge arm connected in parallel with the first bridge arm, wherein the second bridge arm comprises a third switch and a fourth switch connected in series with each other and each having a first terminal and a second terminal, and the second terminal of the third switch is connected to the first terminal of the fourth switch and the second end of the AC power;
   wherein the third switch and the fourth switch operate in ON/OFF states by use of a control signal having an operation frequency consistent with that of the AC power, and the on-state resistance of the third switch and the fourth switch is lower than the on-state resistance of the first switch or the second switch.

2. The PFC circuit of claim 1, further comprising a third bridge arm connected in parallel with the first bridge arm and the second bridge arm, wherein the third bridge arm comprises a fifth switch and a sixth switch connected in series with each other and each having a first terminal and a second terminal, and the second terminal of the fifth switch is connected with the first terminal of the sixth switch, and is coupled to the first end of the AC power via a second inductor.

3. The PFC circuit of claim 2, wherein the first switch of the first bridge arm and the fifth switch of the third bridge arm operate in an alternating manner.

4. The PFC circuit of claim 1, wherein the on-state resistance of the third switch and the fourth switch is half of the on-state resistance of the first switch or the second switch.

5. The PFC circuit of claim 1, further comprising a first surge diode and a second surge diode connected in series with each other and each having a cathode and an anode, wherein the cathode of the first surge diode is connected to the first terminal of the third switch, the anode of the second surge diode is connected to the second terminal of the fourth switch, and the anode of the first surge diode is connected with the cathode of the second surge diode and the second end of the AC power.

6. The PFC circuit of claim 5, wherein each of the first surge diode and the second surge diode is a slow-recovery diode.

7. The PFC circuit of claim 6, wherein when the current flowing through the third switch is less than a predetermined threshold, the first surge diode is in a turned-off state.

8. The PFC circuit of claim 7, wherein when the current flowing through the third switch is larger than the predetermined threshold, the first surge diode is in a turned-on state, and the currents respectively flowing through the third switch and the first surge diode are distributed according to a corresponding on-state resistance.

9. The PFC circuit of claim 1, further comprising a third surge diode and a fourth surge diode connected in series with each other and each having a cathode and an anode, wherein the cathode of the third surge diode is connected to the first terminal of the first switch, the anode of the fourth surge diode is connected to the second terminal of the second switch, and the anode of the third surge diode is connected with the cathode of the fourth surge diode and the first end of the AC power.

10. The PFC circuit of claim 1, further comprising a first surge diode and a second surge diode connected in series with each other and each having a cathode and an anode, and a third surge diode and a fourth surge diode connected in series with each other and each having a cathode and an anode, wherein the anode of the first surge diode is connected with the cathode of the second surge diode and the second end of the AC power, and the anode of the third surge diode is connected with the cathode of the fourth surge diode and the first end of the AC power.

11. The PFC circuit of claim 10, further comprising a clamp capacitor, wherein one terminal of the clamp capacitor is connected to the first terminal of the third switch of the second bridge arm, and the other terminal of the clamp capacitor is connected to the second terminal of the fourth switch of the second bridge arm.

12. The PFC circuit of claim 11, wherein when the voltage between the first end and the second end of the AC power is positive, the surge current sequentially flows through the third surge diode, the clamp capacitor and the second surge diode, so as to form a release circuit.

13. The PFC circuit of claim 11, wherein when the voltage between the first end and the second end of the AC power is negative, the surge current sequentially flows through the first surge diode, the clamp capacitor and the fourth surge diode, so as to form a release circuit.

14. The PFC circuit of claim 1, wherein each of the first switch and the second switch is a wide band gap (WBG) semiconductor component.

15. The PFC circuit of claim 14, wherein the WBG semiconductor component is silicon carbide or gallium nitride.

* * * * *